United States Patent [19]
Sleeter

[11] Patent Number: 6,001,286
[45] Date of Patent: Dec. 14, 1999

[54] MATERIAL FOR ENHANCING WATER TOLERANCE OF COMPOSITE BOARDS

[75] Inventor: Ronald T. Sleeter, Decatur, Ill.

[73] Assignee: Archer Daniels Midland Company, Decatur, Ill.

[21] Appl. No.: 08/919,761

[22] Filed: Aug. 28, 1997

[51] Int. Cl.⁶ .................................................. B29C 67/00
[52] U.S. Cl. ............................ 264/13; 264/28; 264/109; 264/140
[58] Field of Search ................................ 264/13, 28, 109, 264/140

[56] References Cited

U.S. PATENT DOCUMENTS

| | | | |
|---|---|---|---|
| 5,607,633 | 3/1997 | Sleeter et al. | 264/109 X |
| 5,719,301 | 2/1998 | Sleeter | 554/24 |

Primary Examiner—Leo B. Tentoni
Attorney, Agent, or Firm—J. Warren Whitesel; Laff, Whitesel & Saret, Ltd.

[57] ABSTRACT

A method of enhancing water resistance of composites uses a water repellant material which may be applied toward and other fibrous vegetable materials. The method begins with a saturated vegetable or animal fat triglyceride having a low iodine value. The triglyceride is rendered in a form which may be a fine powder, an emulsion, or a dispersion in a liquid. The sprayable triglyceride and a bonding agent are applied to the fibrous materials, preparatory to a press binding. There, the sprayed material is subjected to a hot press cycle in order to form a bonded fibrous composition. The low Iodine Value triglyceride may be selected from a group including hydrogenated vegetable oil, palm oil, stearine, winterized low IV fractions, soy stearine, animal fat, hydrogenated animal fat, and fractionated fats or blends of these materials.

32 Claims, No Drawings

MATERIAL FOR ENHANCING WATER TOLERANCE OF COMPOSITE BOARDS

This invention relates means for and methods of protecting the dimensional stability of fibers (especially fiber composite panels such as oriented strand board, for example) by increasing the resistance to an absorption of moisture and to swelling when in the presence of water. More particularly this invention relates to an accomplishment of such increased moisture resistance through a use of renewable agricultural or animal products, as distinguished from the use of a depleting resource, such as petroleum based products.

Reference is made to U.S. Pat. No. 5,607,633, granted Mar. 4, 1997 which describes a "Co-Adhesive System for Bonding wood, Fibers or Agriculture Based Composite Materials" and to my co-pending application Ser. No. 08/472,919, filed Jun. 7, 1995, and entitled "Method of Conjugating Double Bonds in Drying Oils, now U.S. Pat. No. 5,719,301; granted Feb. 17, 1998. This patent and application describe the use of natural oils containing more than one carbon to carbon double bond. The double bonds are generally separated by a methylene group, commonly described as "methylene interrupted". Double bonds adjacent to one another are "conjugated" (i.e., the methylene interrupt is shifted or relocated).

A simple explanation of methylene interrupt shift is illustrated by the following example showing only carbon atoms:

The carbon chain on the left is methylene interrupted between the two carbon atoms having double bonds. The carbon chain on the right is conjugated by shifting the methylene group to the end of the chain of carbon atoms.

Vegetable oils or animal fats hydrogenated to low or very low iodine values ("IV"), also known as iodine numbers, or fats naturally composed primarily of saturated triglycerides (such as palm oil or fractionated fats) can be used alone or in blend formulations with adhesives/laminants to achieve an enhanced water tolerance for composite materials.

The iodine values or numbers are a measure of the iodine absorbed in a given time by a chemically unsaturated material, such as a vegetable oil and is used to measure the unsaturation or number of double bonds of a compound or mixture. Examples of saturated triglycerides having a low iodine value (a range of Iodine Values of about 0–70 with 0–30 preferred) may be produced by a hydrogenation of a commercial oil or fat, such as oils of: soybean, soy stearine, stearine, corn, cottonseed, rape, canola, sunflower, fish, lard, tallow, palm, palm kernel, coconut, crambe, linseed, peanut, tall oil, animal fats, and blends thereof. These oils may also be produced from genetically engineered plants to obtain low IV oil with a high percentage of fatty acid.

The invention may be used with composite materials which generally include wood, fibers and other agricultural materials and may also contain non-agricultural based fillers and the like such as recycled plastics, etc. Examples of such composites are: particle board, plywood, oriented strand board ("OSB"), medium density fiberboard, hardboard, formed molded shapes, etc. Adhesives and laminants alone or synergistically blended together are used to bond these materials into desired forms such as panels, structural shapes, etc. Laminants/adhesives may include phenol formaldehyde, resol/phenol formaldehyde, urea-formaldehyde, isocyanate, MDI, polyvinyl acetate, protein and other resins, melamine-urea-formaldehyde, di-isocyanate resorcinol-phenol-formaldehyde, protein, tannin-formaldehyde, sulfite liquor, conjugated linseed oil, and combinations of these.

Generally, a petroleum based product known as slack wax is available in either a powdered or emulsified form and is used to enhance moisture tolerance in these and similar composite materials. However, it contains a wide range of compounds with varying degrees of volatility. Also, slack wax suffers from being a non-renewable by-product of the petroleum industry.

The manufacture of certain products based on plant life can produce a concentration of volatile organic compounds ("VOC") which become serious pollutants. Therefore, in the manufacture of any product, such as this invention, a limitation upon the output of the VOC's becomes very important. Federal, state and local regulations severely limit the release of VOC's; for example, see the EPA Clean Air Act.

The above-mentioned composites are subjected to a hot press cycle during their manufacture. When so subjected to this hot press cycle, slack wax products significant amounts of volatile organic carbons ("VOC"). These VOC's present a hazard to workers in the press area and a substance emission problem for the plants producing the composites. Very frequently, the VOC's cause fire hazards in the exhaust flues and stacks.

According to my invention and use of low iodine value ("IV") triglyceride fats, all of the above problems are solved or greatly reduced while providing the desired benefits of increased moisture tolerance. Low IV fat has virtually no volatility under the conditions used for pressing composites and does not present any problem or hazard. Thus, it contributes no or virtually no VOC's to the process, thereby reducing the total plant VOC emissions from the manufacturing process for making OSB and the like. Also, stack fires and worker exposure are reduced.

The invention has an outstanding additional benefit. It is made from a totally renewable agricultural resource and as such is what is known as a "green" product. In fact, almost any triglyceride oil (especially those oils found in common commerce) containing double bonds may be hydrogenated to produce a low IV fat. In general the commodity price of the oil will dictate which is preferable at any given time since the oils are generally interchangeable and the lowest cost is usually the determining factor.

Additionally, a range of iodine values or degrees of completeness of hydrogenation have been found to provide water tolerance. This ability to enhance tolerance was found to decrease with increasing IV. However, the costs of hydrogenation, such as the cost of catalyst usage, reaction time, etc., must also be considered. Therefore, an optimal product having a lowest cost of product versus optimum performance may be the most advantageous.

Fats are commonly fractionated usually by a process known as "winterization" wherein they are chilled for a period of time which is long enough to allow the harder fractions of the fats to crystallize. This chilling is followed by filtration with the harder fractions being retained on a filter cake. These harder fractions have a lower iodine value and, therefore, a melting point that is higher than the melting point of the fat from which it has been separated. Hence, winterization can be used as a source for lower IV fats.

In general, my invention may be used in the form of a spray chilled (prilled), ground, cryo-ground or micro-crystallized powder having a particle size generally passing through a US #100 screen (0.14 mm) or smaller.

Spray prilling may be accomplished by melting the fat and spraying it through either a nozzle of proper configuration or a spinning disk atomizer in order to provide a fine powder as it then solidifies in cool air. It may also be made by grinding with cryo-grinding preferred.

Alternatively, it may also be made by melting/solubilizing the fat into a second liquid and then crystallizing while high shear blending the mixture. Large crystals are preferred. In order to form this slurry of microcrystallized particles, the invention may use the steps of melting low IV triglyceride, and then solubilizing the melt by blending it into a second liquid, and finally crystallizing the solubilized melt under high shear during and after the blending in order to form very small particles. The second liquid may be an adhesive resin, an emulsion of adhesive in water, a conjugated triglyceride co-adhesive or a combination thereof.

In general practice, the low IV fat is applied to the fiberous material before laminating or pressing the wood fibers. However, in order to provide an edge swell retardant in some applications, the low IV fat may be applied generally to the edges of the composite after it is formed. For its application to the composite boards, the low IV fat particles may be sprayed on to the material (such as wood chips) prior to their being bonded. It can also be sprayed on dry with or without the aid of a flowing or anti-caking agent. Or, in a mixture blended with the bonding agent, it may be applied either as a dry powder mixture or as a suspension in a liquid. It may also be applied as a water emulsion and may be emulsified alone or may also be in an emulsion with a bonding agent.

This invention may be used with a co-adhesive. One class of co-adhesives is comprised of drying oils. These oils polymerize and are dry to the touch within short periods of time, typically within five hours. Natural drying oils, such as tung oil, may be used but they are expensive. One commercially manufactured drying oil is sold under the trademark "Archer 1" and is used specifically as a co-adhesive for the manufacture of composite panel products. Archer 1 is a "green" or agricultural based product, primarily a modified linseed oil used as a co-adhesive and is manufactured by the Archer Daniels Midland Co. ("ADM") of Decatur, Ill. 62525. Archer 1 is a conjugated linseed oil prepared by a process that produces an oil with generally 70% conjugation or higher. Archer 1 was designed primarily to be used in the manufacture of composite fiber panel products which includes oriented strand board, particle board, waferboard, and the like. It is an effective co-adhesive used in conjunction with both MDI and dry or liquid PF resins. It is a highly reactive co-adhesive that enables manufacturers to reduce the amount of resin that is used in the manufacture of panels and the like. The method and material using Archer 1, described in U.S. Pat. No. 5,607,633 issued Mar. 4, 1997, provides synergistic bonding for producing enhanced composite board properties.

One final advantage resulting from using the low IV fats as a replacement for slack wax was a discovery made while comparing the test results of commercial petroleum based slack wax versus the low IV fat. Since the slack wax has appreciable quantities of volatile organic hydrocarbons, much of the effectiveness of the wax may be lost. Depending on the type of slack wax that is used, a significant amount of the wax may be lost into the atmosphere during the hot press cycle. This loss of wax leaves a reduced amount of it in the bonded composite which in turn reduces its effectiveness for useful water tolerance.

Since the low IV fats have virtually no loss of volatiles during the press cycle, all of the added fat is useful for water repellance. Therefore, a significantly larger amount of slack wax must be used to match a correspondingly lower amount of low IV fat in order to produce essentially the same effective water repellency. This effect can be seen dramatically in Example 3 where the amount of low IV fat that was needed was only about 75% of the amount of slack wax that is conventionally used. Moreover, this small amount of low IV fat outperformed the slack wax. The use of correspondingly lower amounts of low IV fats versus slack wax result in an effective cost advantage for low IV fats as well.

EXAMPLE 1

The following fats were blended with conjugated linseed oil and compared with a blend made in the conventional manner with slack wax.

Test Composition Tested

| Test | Composition tested | |
|---|---|---|
| 1) | Control 30% slack wax | 70% conjugated oil (Archer 1) |
| 2) | 30% Palm Oil stearine | 70% conjugated oil (Archer 1) |
| 3) | 30% Soy stearine | 70% conjugated oil (Archer 1) |

The test results are taken on test panels (24"×24") of oriented strand board.

| Test | 24 hr water absorption | 24 hour thickness swell |
|---|---|---|
| 1) | 27% | 26.9% |
| 2) | 33% | 28.8% |
| 3) | 35% | 22.8% |

The thickness swell is regarded as the most important parameter of the two (absorption and swell) parameters that were tested. Soy stearine far outperformed the industry standard (control 30% slack wax) with a four percentage point advantage. Palm stearine, which like the soy stearine was hydrogenated to a zero IV, did not perform as well as either the soy stearine or the slack wax. This illustrates a second parameter effecting the ability of a fat to provide water repellency. That second parameter is the chain length of the fat. Palm stearine is primarily composed of fatty acids of a 16-carbon chain, while soy stearine is an 18-carbon fat. Water absorption for either soy or palm was not as good as for the slack wax, but was within the desired board specification parameters. Water absorption is not generally regarded as important as the edge swell.

EXAMPLE 2

Another test was specifically designed to compare the volatile organic carbons emitted. Testing was done using EPA Test Method 24 for volatile content of liquid materials. Commercially available petroleum wax was compared to a 50/50 blend of low IV fat/Archer 1.

The two waxes (petroleum and blend) were heated to 157 Deg. C. to reduce them to a liquid form. Then, the liquid was poured into glass beakers which were then placed in a 450 Deg. C. forced draft oven. Considerable smoke was observed with the slack wax. No volatiles were observed with the low IV fat system. After three hours, the commercial slack wax had lost 0.65% of its original weight due to volatilization while the low IV fat had lost only 0.03% of its original weight. The test indicated that a mill making composite board, for example, could potentially reduce the VOC emissions contributed by the slack wax system by 90% when they replace it with the low IV fat.

EXAMPLE 3

A test iodine value (IV) versus bonding and water tolerance was done by hydrogenated soybean oil to various IV's (75, 57.2, 38.5, 20.7 and 0). The following Table A illustrates a finding that the optimum IV is 0 or as low as possible. All properties of interest declined in their performance as the IV increased from 0. However, in practice, the expense of hydrogenating oils to 0 IV makes it necessary to find trade-offs which must be factored in for the performance that is gained versus the expense to produce. Therefore, optimally, for most uses a hydrogenation to an IV of 20–25 yields the best value in performance versus cost to produce.

TABLE A

| IV Level | MOE | MOR | IB | TS | WA | LE |
|---|---|---|---|---|---|---|
| 0 | 723534 | 4516 | 45 | 28.4 | 73.4 | 0.33 |
| 20.7 | 797393 | 3411 | 42.1 | 41.7 | 95.2 | 0.38 |
| 38.5 | 824366 | 3899 | 37.3 | 33.4 | 80.2 | 0.33 |
| 57.2 | 745987 | 3723 | 37.2 | 41.0 | 91.1 | 0.36 |
| 75 | 733507 | 3544 | 35.5 | 45.8 | 95.5 | 0.42 |

MOE = Modulus of Elasticity;
MOR = Modulus of Rupture;
IB = Internal Bond Strength;
TS = Thickness Swell;
WA = Water Absorption;
and
LE = Linear Expansion.

EXAMPLE 4

A powdered wax and wax emulsion evaluation was made by testing various levels of 0 Iodine Value soybean oil versus no wax and versus 1% Paracol (commercial slack wax) as controls. The evaluation was made during the manufacture of oriented strand boards made with aspen/white birch strands. The face resin was Georgia Pacific powdered PF and the core resin was Borden powdered PF. The face to core ratio was 60:40. Eight panels per group were pressed and averaged.

In a conventional OSB formulation, 1% Paracol is used to achieve the water repellency and dimensional stability required for good manufacturing practice in order to produce boards within acceptable specifications. The emulsion that was tested was a 30% wax composition with the addition of Archer 1 as a synergistic adhesive. The powdered wax was the low stearine. The test results are set forth in Table B.

TABLE B

| Test Group | % Resin Addition* | % Powdered Wax | % Emulsion | Wax Content | % Thickness Swell | % Water |
|---|---|---|---|---|---|---|
| Control 1 | 2.2 | 0 | 0 | 0.00 | 82.7 | 151.3 |
| Control 2 | 2.2 | 0 | 1.0 Paracol | 1.00 | 37.2 | 84.0 |
| 1 | 2.2 | 5 | 0 | 0.11 | 46.3 | 123.9 |
| 2 | 2.2 | 5 | 1.5 | 0.6 | 38.0 | 88.4 |
| 3 | 2.2 | 10 | 1.0 | 0.22 | 42.9 | 102.8 |
| 4 | 2.2 | 10 | 1.5 | 0.74 | 37.0 | 84.2 |
| 5 | 2.2 | 20 | 0 | 0.33 | 41.0 | 94.3 |
| 6 | 2.2 | 20 | 1.5 | 0.93 | 36.0 | 84.2 |

* Face and Core

It is apparent from Table B that the soy stearine provided excellent water repellency, even as low as 5% addition. With the 1% Paracol as the industry target for TS and WA of 37 and 84, respectively, a match was achieved with Test Group 4 using 10% stearine and 1.5% emulsion. The TS and WA were 37 and 84 respectively. It is also apparent that far less soy stearine was actually needed than is routinely used to achieve the desired dimensional stability. A total of 1% wax was needed for Paracol and only 0.74% was needed for stearine.

EXAMPLE 5

A test was run to compare two commercial adhesive systems with Archer 1/soy stearine emulsions. An aspen/birch combination with a moisture content of 3.5% was used for the strands. A 2.25 powder phenolic resin, or a 3.5% liquid phenolic resin was used. A 1% additional rate of either the commercial slack wax emulsion or Archer 1/stearine emulsion was added. For each test, a total of 5 panels were made and averaged. The press time was 4.5 minutes. The results of this test are set forth in Table C.

TABLE C

SUMMARY

| TESTS | MOE | MOR | IB | LE | TS | WA |
|---|---|---|---|---|---|---|
| Liquid PF resin | | | | | | |
| Control | 812842 | 4896 | 49.6 | 0.36 | 34.9 | 76.1 |
| Archer 1/Stearine | 723534 | 4516 | 45.5 | 0.33 | 28.4 | 73.4 |
| Powder PF resin | | | | | | |
| Control | 535799 | 2082 | 20.2 | 0.50 | 53.3 | 100.2 |
| Archer 1/Stearine | 822313 | 4597 | 34.7. | 0.37 | 35.1 | 79.1 |

The results of the liquid resin panels indicate a beneficial reduction in all physical panel properties. The mechanical properties (MOE, MOR, IB) were fairly comparable in all of the tests. The powder panel test results exhibited a significant beneficial increase in mechanical properties and a significant beneficial decrease in physical panel properties versus the commercial wax emulsion.

EXAMPLE 6

Another test was run at an internationally recognized testing laboratory to provide an independent analysis of the products of this invention. A number of parameters were tested using strands provided by the testing lab, Borden wax emulsion, and power PF resin and MDI (Rubinate 1840), were also supplied by the testing lab. The press temperature was 400 deg. F. and the press time was 275 seconds.

Table D sets forth a comparison of the inventive stearine based water tolerance enhancer with commercially available slack wax.

TABLE D

| Property | Powder Control | Powder Test | Liquid Control | Liquid Test |
|---|---|---|---|---|
| MOR | 3170 | 3720 | 3970 | 4660 |
| MOE | 549000 | 586000 | 608000 | 693000 |
| Wet Mod. of Rupture | 1650 | 1910 | 2280 | 2250 |
| IB | 60.8 | 58.5 | 75.2 | 73.3 |
| 24 Hr. Thickness Swell | 19.3 | 22.9 | 15.9 | 18.2 |
| 24 Hr. Water Absorption | 34.1 | 41.2 | 34.6 | 38.9 |
| LE | 0.33 | 0.32 | 0.26 | 0.25 |
| TS | 43.5 | 41.1 | 33.3 | 32.9 |

Those who are skilled in the art will readily perceive how to modify the invention. Therefore, the appended claims are to be construed to cover all equivalent structures which fall within the true scope and spirit of the invention.

The invention claimed is:

1. A method of enhancing water resistance and water tolerance of composite boards and structures by a use of water repellant material applied to fibrous plant and wood materials, said method comprising:
   a) providing a water repellant material comprising a saturated triglyceride having a low iodine value, said triglyceride being selected from a group consisting of vegetable oil and animal fat;
   b) rendering said triglyceride sprayable in a form selected from a group consisting of a fine powder, an emulsion, and a dispersion in a liquid;
   c) applying a combination of said triglyceride of steps a) and b) and a bonding agent to said fibrous materials preparatory to press binding; and
   d) subjecting said materials of step c) to a hot press cycle in order to form a bonded fibrous composition.

2. The method of claim 1 wherein said triglyceride and bonding agent of step c) are blended into a mixture at a time when it is applied to said fibrous mixture.

3. The method of claim 1 wherein said triglyceride and said bonding agent are separately applied to said fibrous material in step c).

4. The method of claim 1 where a low Iodine Value triglyceride is selected from a group consisting of hydrogenated vegetable oil, palm oil, stearine, winterized low IV fractions, soy stearine, animal fat, hydrogenated animal fat, and fractionated fats and blends of these materials.

5. The method of claim 1 where the low Iodine Value is in a range from about 0 to about 70.

6. The method of claim 1 where the low Iodine Value is in a range from about 0 to about 30.

7. The method of claim 1 wherein the fibrous plant and wood materials are selected from a group consisting of wood, wood fibers, agricultural fibers, agricultural materials, and mixtures of these materials with plastics or polymers.

8. The method of claim 7 wherein said plastics or polymers are selected from a group consisting of virgin and recycled plastics or polymers.

9. The method of claim 1 wherein the saturated triglyceride in step a) has a low iodine value with a range of about 0–70 produced by a hydrogenation of a commercial oil or fat, taken from a group consisting of soybean, corn, cottonseed, rape, canola, sunflower, fish, lard, tallow, palm, palm kernel, coconut, crambe, linseed, peanut, and tall oil.

10. The method of claim 1 wherein the saturated triglyceride in step a) has a low iodine value and is made of a genetically engineered plant to yield a fat that has a high percentage of saturated fatty acids.

11. The method of claim 1 wherein the triglyceride of step b) is a water repellant material which is spray prilled to provide solidified particles with a range of particle sizes from about 0.01 mm to about 28 mm.

12. The method of claim 1 wherein the triglyceride of step b) is in the form of particles having a range of particle sizes from about 0.02 mm to 0.14 mm.

13. The method of claim 1 wherein the water repellant material of step a) is microcrystallized to form solidified particles formed by the further steps of: 1) melting low IV triglyceride; 2) solubilizing the melt of step 1) by blending it into a second liquid; and 3) crystallizing said solubilized melt of step 2) under high shear during and after the blending step 2) in order to form very small particles.

14. The method of claim 13 wherein said second liquid in step 2) is selected from a group consisting of an adhesive resin, an emulsion of adhesive resin and water, a conjugated triglyceride co-adhesive, and combinations thereof.

15. The method of claim 1 wherein the water repellant material of step a) is cryo-ground to provide solidified low IV triglyceride particles in a range of particle size from about 0.01 mm to 28 mm.

16. The method of claim 1 wherein the water repellant material of step a) is cryo-ground to provide solidified low IV triglyceride particles in a range of about 0.02 mm to 0.14 mm.

17. The method in any one of the claims 11, 12, 13, 15 or 16 wherein the water repellant material of step a) is converted into particles having a particular size wherein a majority of the particles are of a size which will pass through a U.S. 100 screen (0.14 mm).

18. The method of use in claim 1 wherein the bonding adhesive is taken from a group consisting of urea-formaldehyde, melamine-urea-formaldehyde, polyvinyl acetate, phenol formaldehyde, isocyanate, di-isocyanate resorcinol-phenol-formaldehyde, protein, tannin-formaldehyde, sulfite liquor and conjugated linseed oil and any combinations of these.

19. The method of claim 1 wherein the said emulsion in step b) is a water and low IV triglyceride emulsion.

20. The method of claim 18 wherein the emulsion of step b) is part of an emulsion of the bonding adhesive.

21. The method of claim 18 wherein the said liquid of step b) is an adhesive or co-adhesive of the bonding adhesive.

22. The method of anyone of the claims 11, 12, 13, 15, or 16 wherein said liquid of claim 1, step b) is selected from a group consisting of an adhesive resin, a conjugated triglyceride co-adhesive, an emulsion of adhesive resin and water, and an emulsion of conjugated triglyceride co-adhesive and water or any combinations thereof.

23. The method of any of the claims 11, 12, 13, 15, or 16 wherein said dispersion in a liquid of claim 1, step b) utilizes a conjugated triglyceride co-adhesive as the liquid.

24. The method of claim 6 wherein the liquid of step b) is selected from a group consisting of water, a bonding resin, a bonding resin emulsion, and a co-adhesive, said co-adhesive being in a form selected from a group consisting of a neat liquid, an emulsion, and combinations thereof.

25. The method of claim 18 wherein the bonding agent is emulsified with a material selected from water alone, a low IV triglyceride, or combinations thereof with the aid of emulsifiers.

26. The method of claim 18 wherein the low IV fat is made as a 0.02 mm to 0.14 mm particle size powder in a form selected from a group consisting of said powder alone, said bonding adhesives, and combinations thereof.

27. The method of claim 18 wherein the low IV triglyceride used in combination with said bonding adhesive is in the form selected from a group consisting of a neat blend of adhesive and fat.

28. The method of claim 1 step b) wherein the said emulsion is water and low IV triglyceride emulsion.

29. The method of use in claim 1 wherein the emulsion is part of an emulsion of the bonding agent selected from a group consisting of urea-formaldehyde, melamine-urea-formaldehyde, polyvinyl acetate, phenol formaldehyde, isocyanate, di-isocyanate resorcinol-phenol-formaldehyde, protein, tannin-formaldehyde, sulfite liquor and conjugated linseed oil and any combinations of these.

30. The method of use in claim 1 wherein the liquid of claim 1 step b) wherein said liquid is a co-adhesive selected from a group consisting of urea-formaldehyde, melamine-urea-formaldehyde, polyvinyl acetate, phenol formaldehyde, isocyanate, di-isocyanate resorcinol-phenol-formaldehyde, protein, tannin-formaldehyde, sulfite liquor and conjugated linseed oil and any combinations of these.

31. The method of anyone of the claims 11, 12, 13, 15, or 16 wherein the liquid in claim 1, step b) is selected from a group consisting of water, a bonding resin, a bonding resin emulsion, and a co-adhesive selected from a group consisting of urea-formaldehyde, melamine-urea-formaldehyde, polyvinyl acetate, phenol formaldehyde, isocyanate, di-isocyanate resorcinol-phenol-formaldehyde, protein, tannin-formaldehyde, sulfite liquor and conjugated linseed oil and any combinations of these taken in a form which is either neat, or an emulsion, a combination thereof.

32. The method of any one of the claim 11, 12, 13, 15 or 16 wherein the bonding adhesives is emulsified with water alone in combination with a low IV triglyceride.

* * * * *